United States Patent [19]
Archibald et al.

[11] 3,870,721
[45] Mar. 11, 1975

[54] 4-ALKANOYLAMINO ISOQUINOLINE DIONES AND 3-ALKANOYLOXY-4-ALKANOYLAMINO ISOQUINOLONES

[75] Inventors: John Leheup Archibald, Windsor; John Terence Arnott Boyle; John Christopher Saunders, both of Maidenhead, all of England

[73] Assignee: John Wyeth & Brother Limited, Taplow, Maidenhead, Berkshire, England

[22] Filed: Nov. 21, 1973

[21] Appl. No.: 417,867

[30] Foreign Application Priority Data
Nov. 30, 1972 Great Britain............ 55252/72

[52] U.S. Cl.......... 260/281, 260/287 R, 260/288 R, 260/289 R, 424/250
[51] Int. Cl............................................. C07d 35/30
[58] Field of Search.................. 260/287 R

[56] References Cited
UNITED STATES PATENTS

| | | | |
|---|---|---|---|
| 3,452,026 | 6/1969 | Perron et al. | 260/287 R |
| 3,506,667 | 4/1970 | Kaminsky | 260/287 R |
| 3,641,032 | 2/1972 | Zinnes et al. | 260/287 R |
| 3,726,875 | 4/1973 | Kadin | 260/281 |

OTHER PUBLICATIONS
"Chemical Abstracts", Vol. 62, 4031c, Shiotani et al., 1964.

*Primary Examiner*—Donald G. Daus
*Assistant Examiner*—D. Wheeler

[57] ABSTRACT

New compounds are described of the formula

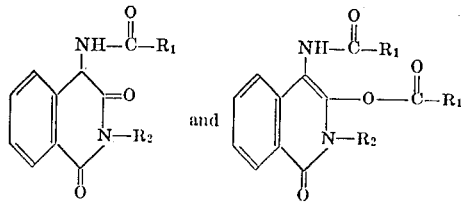

where $R_1$ is lower alkyl and $R_2$ is hydrogen or lower alkyl. The compounds are useful pharmaceutically and in particular, anti-bacterial activity, depressant activity, anti-fungal activity and inhibition of blood platelet aggregation are mentioned.

4 Claims, No Drawings

4-ALKANOYLAMINO ISOQUINOLINE DIONES AND 3-ALKANOYLOXY-4-ALKANOYLAMINO ISOQUINOLONES

The present invention relates to new isoquinoline derivatives, a process for their preparation and pharmaceutical compositions containing the new compounds.

We have found that new compounds believed to possess the formulae

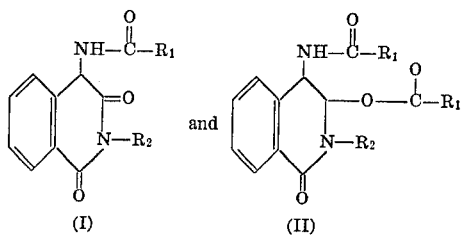

(where $R_1$ represents a lower alkyl group, preferably a methyl group, and $R_2$ represents a hydrogen atom or a lower alkyl group, preferably a hydrogen atom or a methyl group) can be obtained by catalytic hydrogenation of compounds of the formula

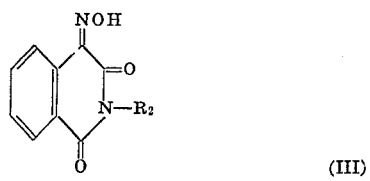

(where $R_2$ is as defined above) in the presence of an acylating agent that introduces one or two acyl groups of formula

(where $R_1$ is as defined above). In particular it has been found that the use of the acid anhydride of formula

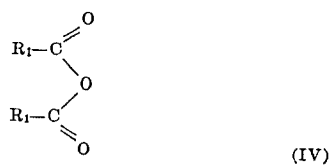

as the acylating agent will favor formation of the product containing two acyl groups, whilst the use of a mixture of the acid $R_1COOH$ with its anhydride of formula IV will promote formation of the product containing a single acyl group. The compounds of formula III are known or, if new, accessible by analogy with known methods. The catalytic hydrogenation is preferably carried out using a palladium/carbon catalyst. The product may be recovered from the reaction mixture by standard isolation procedures.

The term "lower" as used herein in relation to alkyl groups denotes that the alkyl group contains up to six carbon atoms, preferably up to four carbon atoms. As illustrative lower alkyl groups there may be mentioned methyl, ethyl, n-propyl, i-propyl, n-butyl etc.

The structural assignment of formulas I and II is based upon spectrographic evidence. However it will be appreciated that other tautomeric formulae may be assigned to the same compounds and any possible tautomeric equivalents are intended to be included within the invention.

The new compounds of the invention may also be prepared by a second method. In the second method there is used, as starting material, 4-amino 1,2,3,4-tetrahydro-1,3-isoquinolinedione or a 2-lower alkyl derivative thereof having the formula

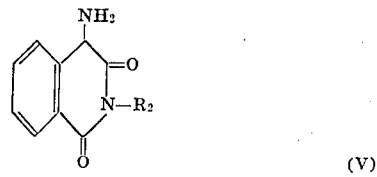

wherein $R_2$ is lower alkyl. This compound may be prepared by catalytic hydrogenation of a compound of formula III in the absence of an acylating agent. According to the second method the compound of formula V is acylated to give a compound of formula I under conditions such that the compound of formula V does not decompose

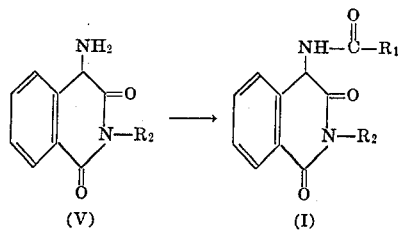

In particular the compounds of formula V tend to decompose under strongly basic conditions. The acylation may be carried out by reacting the compound of formula V with the acid $R_1COOH$ in the presence of a condensing agent, for instance, a carbodiimide.

The preferred new compounds of the invention are those of the formulae

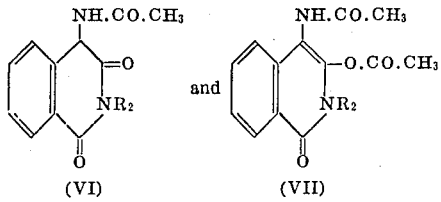

where $R_2$ is methyl or hydrogen.

The compounds of formulae I and II are useful pharmacologically. In particular the compounds of formula II exhibit action on the central nervous system of warm-blooded animals, particularly as a depressant. The compounds of formula I show anti-bacterial activity, particularly against such organisms as *Bacillus subtilis*, *Staph. aureus* and *Herellea* species and also, in some cases, inhibition of blood platelet aggregation and anti-fungal activity, particularly against *Trichophyton mentagrophytes*, and action on the central nervous system of warm-blooded animals, particularly as a depressant. The inhibition of blood platelet aggregation exhibited by 4-acetamido-1,2,3,4-tetrahydro-1,3-isoquinolinedione is particularly interesting.

The present invention also provides pharmaceutical compositions containing, as active ingredient a compound of formula I or II, which may be micronized if desired. In addition to the active ingredient, said compositions also contain a non-toxic carrier. Any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavoring agents, lubricants, solubilizers, suspending agents, binders, or tablet disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80 percent of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75 percent of the glycol by weight is generally suitable. In other instances compositions can be made by dispersing the finely-divided active ingredient in aqueous starch or sodium carboxymethyl cellulose solution, or in a suitable oil, for instance arachis oil. Liquid pharmaceutical compositions which are sterile solutions or suspensions can be utilised by intramuscular, intraperitoneal or subcutaneous injection. In many instances a compound is orally active and can be administered orally either in liquid or solid composition form.

Preferably the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule, cachet or tablet itself, or it can be the appropriate number of any of these in package form. The quantity of active ingredient in a unit dose of composition may be varied or adjusted from 5 mg. or less to 500 or more, according to the particular need and the activity of the active ingredient. The invention also includes the compounds in the absence of carrier where the compounds are in unit dosage form.

The invention is illustrated by the following Examples:

EXAMPLE 1

4-Acetamido-3-acetoxy-1,2-dihydro-1-isoquinolone 1.90 grams of 1,2,3,4-tetrahydro-1,3,4-isoquinolinetrione-4-oxime were dissolved in 100 millilitres of acetic anhydride, and hydrogenated at a pressure of 50 p.s.i. at room temperature, in the presence of 0.2 grams of 10% palladium-on-carbon catalyst. The resulting mixture was warmed, filtered to remove the catalyst, and the filtrate allowed to cool. A small quantity of white crystals separated from the solution and were filtered off. The filtrate was evaporated to dryness and the residue was recrystallised from isopropanol to give 0.63 grams of the title compound. Melting point 172° C. Analysis: found 60.3%C, 4.9%H, 10.8%N, $C_{13}H_{12}N_2O_4$ requires 60.0%C, 4.7%H, 10.8%N.

EXAMPLE 2

4-Acetamido-1,2,3,4-tetrahydro-1,3-isoquinolinedione 9.51 grams of 1,2,3,4-tetrahydro-1,3,4-isoquinolinetrione-4-oxime were dissolved in 400 millilitres of glacial acetic acid with 12 millilitres of acetic anhydride present, and hydrogenated at 50 p.s.i. at room temperature, in the present of 1.0 grams of 10 percent palladium-on-carbon catalyst. The resulting mixture was filtered, the filtrate was evaporated to dryness and the residue was recrystallised from a mixture of 33 percent ethanol and 67 percent water to give 8.4 grams of the title compound. Melting point 221° C. Analysis: found 60.7%C, 4.7%H, 12.6%N; $C_{11}H_{10}N_2O_3$ requires 60.5%C, 4.6%H, 12.8%N.

EXAMPLE 3

4-Acetamido-2-methyl-1,2,3,4-tetrahydro-1,3-isoquinolinedione 4.08 grams of 2-methyl-1,2,3,4-tetrahydro-1,3,4-isoquinolinetrione-4-oxime were dissolved in 100 millilitres of glacial acetic acid with 4.8 millilitres of acetic anhydride present, and hydrogenated at a pressure of 50 p.s.i. at room temperature, in the presence of 0.4 gram of 10 percent palladium-on-carbon catalyst. The reaction mixture was filtered, the filtrate evaporated to dryness and the residue was recrystallised twice from a mixture of 33 percent ethanol and 67 percent water and then from ethyl acetate to give 1.44 grams of the title compound, Melting point 200° C. Analysis found 62.0%C, 5.2%H, 12.2%N; $C_{12}H_{12}N_2O_3$ requires 62.1%C, 5.2%H, 12.1%N.

EXAMPLE 4

4-n-Butyramido-1,2,3,4-tetrahydro-1,3-isoquinolinedione 1,2,3,4-Tetrahydro-1,3,4-isoquinolinetrione-4-oxime is hydrogenated in the presence of n-butyric acid and n-butyric anhydride in a similar manner to that described in Example 2 to give the title compound.

EXAMPLE 5

4-Propionamido-2-n-propyl-1,2,3,4-tetrahydro-1,3-isoquinolinedione 2-n-Propyl-1,2,3,4-tetrahydro-1,3,4-isoquinolinetrione-4-oxime is hydrogenated in the presence of propionic acid and propionic anhydride in a similar manner to that described in Example 3 to give the title compound.

EXAMPLE 6

4-Acetamido-2-n-hexyl-1,2,3,4-tetrahydro-1,3-isoquinolinedione 2-n-Hexyl-1,2,3,4-tetrahydro-1,3,4-isoquinolinetrione-4-oxime is hydrogenated in the presence of acetic acid and acetic anhydride in a similar manner to that described in Example 3 to give the title compound.

EXAMPLE 7

4-Acetamido-3-acetoxy-2-ethyl-1,2-dihydro-1-isoquinolone

2-Ethyl-1,2,3,4-tetrahydro-1,3,4-isoquinolinetrione-4-oxime is hydrogenated in acetic anhydride in a similar manner to that described in Example 1 to give the title compound.

We claim:

1. A compound selected from those of the formulae

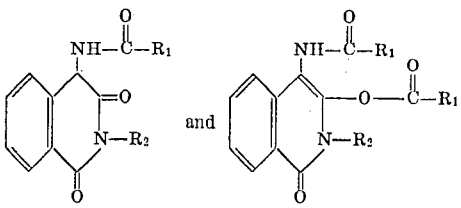

and wherein $R_1$ is lower alkyl and $R_2$ is selected from the group consisting of hydrogen and lower alkyl.

2. A compound as defined in claim 1, which is 4-acetamido-3-acetoxy-1,2-dihydro-1-isoquinolone.

3. A compound as defined in claim 1, which is 4-acetamido-1,2,3,4-tetrahydro-1,3-isoquinolinedione.

4. A compound as defined in claim 1, which is 4-acetamido-2-methyl-1,2,3,4-tetrahydro-1,3-isoquinolinedione.

* * * * *